UNITED STATES PATENT OFFICE.

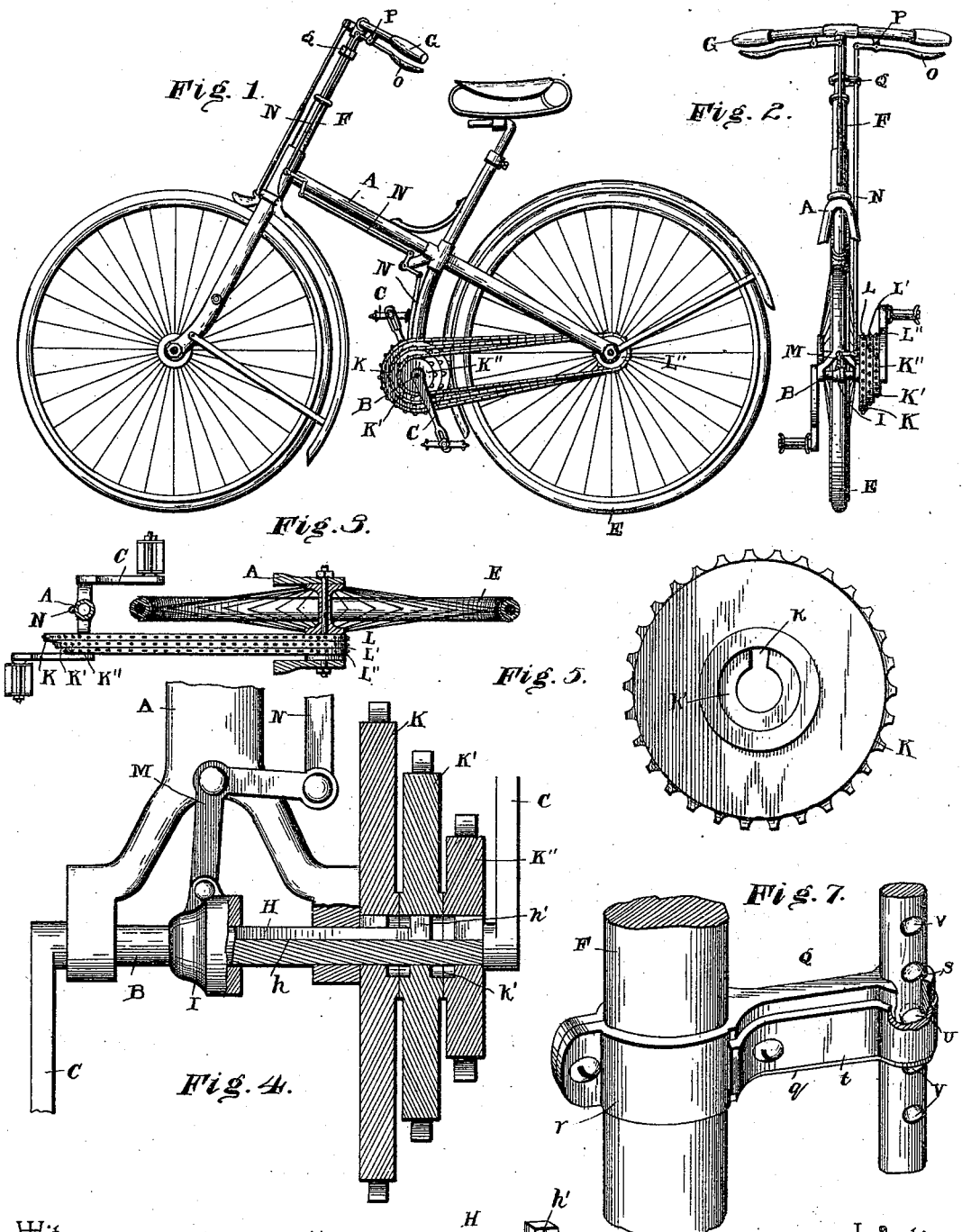

WILLIAM W. CARNS, OF TYRONE, PENNSYLVANIA.

DRIVING MECHANISM FOR CYCLES.

SPECIFICATION forming part of Letters Patent No. 501,054, dated July 11, 1893.

Application filed August 31, 1892. Serial No. 444,664. (No model.)

*To all whom it may concern:*

Be it known that I, WILLIAM W. CARNS, a citizen of the United States, residing at Tyrone, in the county of Blair and State of Pennsylvania, have invented a new and useful Driving Mechanism for Cycles, of which the following is a specification.

My invention relates to improvements in driving mechanism for bicycles, tricycles, and similar machines, the object in view being to provide mechanism which is simple in construction, compact in its arrangement, and convenient and reliable in its operation, by which the speed may be varied according to the nature or character of the road over which the machine is propelled, so as to secure power or speed at the will of the rider without dismounting, or to permit the machine to be used for coasting without removing the feet from the driving-pedals.

Further objects and advantages of my invention will appear in the following description, the novel features thereof being particularly pointed out in the appended claims.

In the drawings:—Figure 1 is a side view of a bicycle provided with my improved gearing. Fig. 2 is a front view of the same. Fig. 3 is a plan view, partly in section upon the line $xx$ of Fig. 1. Fig. 4 is a transverse sectional view, parallel with the driving-shaft. Fig. 5 is a side view of one of the gears carried by the driving-shaft. Fig. 6 is a detail view of the slide carried by the driving-shaft to engage different gears. Fig. 7 is a detail view of the stop mechanism which I employ to hold the parts in their several adjusted positions.

A represents the frame of the machine; B the driving shaft, carrying the pedals, C C; D the axle to which the driving shaft is geared, said axle carrying the driving-wheel, E; F the head-post; and G the handle-bar attached to the head-post. The driving-shaft is provided with a longitudinally-disposed groove or way, $h$, in which fits the slide, H, provided at its outer end with the stud $h'$ and connected at its inner end to a sliding sleeve, I, which embraces and slides upon the shaft.

K, K', K'', represent, respectively, gears of different diameters which are loosely mounted upon the driving-shaft, and are provided, in communication with their bearings, with sockets, $k$, to receive the stud upon the end of the adjusting-slide, H. These gears are further provided, around their bearings, in the opposite faces, with annular channels, $k'$ whereby the adjusting slide may be so disposed as to arrange the stud, $h'$, between two adjacent gears and out of contact with both, thereby disconnecting the driving-shaft from the gears and enabling the latter to rotate with the axle, as when coasting, without affecting the pedals. By sliding the sleeve, I, to the right or left either of the gears may be coupled to the driving shaft. A similar number of gears, L, L', L'', preferably of equal size, are fixedly attached to the axle of the driving-wheel, and sprocket chains, or link-belts, of any approved construction connect the loose gears, respectively, to the fixed gears, whereby the rotary movement of the driving shaft may be communicated directly to the axle of the driving wheel, either diminished or increased in speed, according to the gear with which the adjusting slide is engaged.

To the sleeve which operates upon the driving-shaft and moves the adjusting-slide, is attached one arm of the bell-crank lever, M, the other arm of the same being connected by means of the rod, N, to the inner end of the hand-lever, O, which is fulcrumed in a hanger, P, depending from the handle-bar.

Upon the head-post is arranged a stop-mechanism, Q, consisting of a bracket, $q$, having an adjustable ring, $r$, to encircle the head-post, a guide-eye $s$ to encircle the connecting rod between the hand-lever and the bell-crank lever, and a spring latch, $t$, secured to the bracket and provided with a stop-pin, $u$, which projects through an aperture in the side of the guide-eye and engages one of a series of depressions $v$ which are formed in said connecting-rod, these depressions being so arranged as to indicate the points to "stop" the gear-adjusting mechanism to secure the desired result.

Having thus described my invention, what I claim, and desire to secure by Letters Patent of the United States, is—

The combination with the driving-shaft, adjusting slide, loose gears connected to fixed gears upon the axle of the driving-wheel, the hand-lever, and the connecting devices between the hand-lever and the adjusting slide, comprising a bell-crank lever and a connecting-rod, of the stop-mechanism having a guide-eye embracing said connecting-rod, and a spring-latch provided with a pin to engage depressions in said rod, substantially as specified.

In testimony that I claim the foregoing as my own I have hereto affixed my signature in the presence of two witnesses.

WILLIAM W. CARNS.

Witnesses:
C. W. GRAY,
H. C. KYSER.